Aug. 23, 1966 F. V. HUNT 3,268,231
METHOD OF AND APPARATUS FOR REPRODUCTION OF PHONOGRAPH RECORDS AND THE LIKE
Filed Sept. 24, 1963
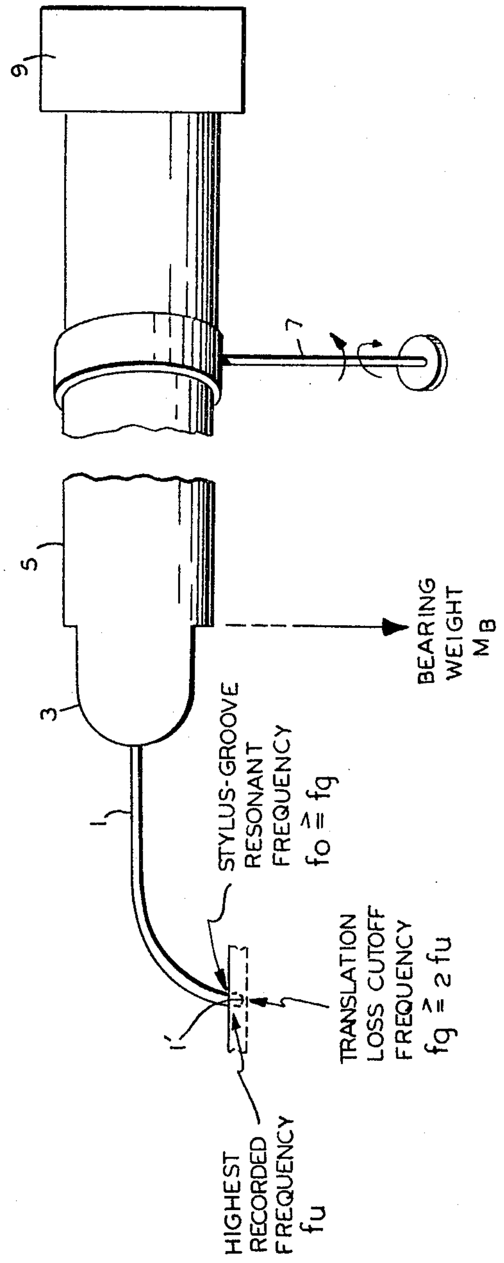
INVENTOR
FREDERICK V. HUNT
BY Rines and Rines
ATTORNEYS 3,268,231
Patented August 23, 1966

3,268,231
METHOD OF AND APPARATUS FOR REPRODUCTION OF PHONOGRAPH RECORDS AND THE LIKE

Frederick V. Hunt, 44 Beatrice Circle, Belmont, Mass.
Filed Sept. 24, 1963, Ser. No. 311,096
13 Claims. (Cl. 274—23)

The present invention relates to methods of and apparatus for phonograph-record reproduction, being more specifically directed to novel phonograph pickups and similar devices.

The desirability of improved reproduction and wear advantages residing in markedly reducing the bearing weight of phonograph pickups, vibration pickups or similar devices, all hereinafter generically referred to as "pickup" devices, has long been recognized; but the various tone arm and styli constructions proposed and employed through the years have, none-the-less, been far heavier than is actually required and, in addition, have been subject to playback losses and/or restrictions on translation-loss-free bandwidth that have come to be routinely accepted as "inherent" in such devices. The discoveries underlying the present invention, however, have demonstrated that there is no such inherency and that, through appropriate and novel selection of equivalent tone-arm mass, stylus compliance, and equivalent stylus mass in terms of bearing weight, and through particular relative and critical placement of stylus-groove resonance frequencies and translation loss and scanning loss cutoff frequencies, for particular frequencies of tone-arm resonance and of free resonance of the stylus system, highly superior performance can be attained with ultra-lightweight pickups that are at least an order of magnitude smaller in bearing weight (of the order of 0.1 gram and less) than present-day pickup devices.

An object of the invention, accordingly, is to provide a new and improved method of and apparatus for phonograph reproduction and the like that overcomes the above-described and other limitations of prior-art pickups.

A further object is to provide a novel ultra-lightweight phonograph pickup.

An additional object is to provide a novel ultra-light weight stylus and arm of more general utility which may be employed wherever any of the advantageous features of the invention are sought.

Other and further objects will be explained hereinafter and will be more particularly pointed out in the appended claims.

The invention will now be described in connection with the accompanying drawing, the single figure of which is a side elevation of a phonograph pickup designed in accordance with a preferred embodiment of the invention.

The pickup comprises a stylus shown in the form of a thin wire 1, held by a supporting or mounting tube 3 that may plug into an end of a tone arm 5, rotatable near its other end about a two-degree of freedom pivot 7, at which other end, a counterweight 9 may be provided. The pickup bearing weight $M_B$ (grams) is defined as an equivalent unbalanced mass, located at the stylus end of the tone arm 5, upon which the action of gravity would produce a downward vertical bearing or stlyus force of $M_Bg$ (dynes), were $g$ is the gravitational constant (980 cm./sec.$^2$). This stylus force is transmitted through the stylus support 3 and the elastic stylus 1 to the hardened or jeweled stylus tip 1', where it is just balanced, in both static and dynamic equilibrium, by the vertical components of the normal force reactions at each of the two record-groove walls, shown dotted. The restoring force provided by the preloading of the vertical compliance of the stylus by the bearing force must be made sufficient to impart to the stylus any acceleration which may be required in order to keep it always in contact with both groove walls, said contact with both groove walls but not with the bottom of the groove being maintained in accordance with the teachings of my earlier Patent No. 2,239,717. The variational compliance $C_{LV}$ of the stylus suspension, moreover, should be substantially the same for lateral or vertical motion in order that the stylus 1 may track lateral, vertical, 45°-right, or 45°-left modulation with substantially equal facility.

It has been determined that, particularly for reproducing present-day stereo recordings, the mechanical parameters of the stylus suspension compliance $C_{LV}$ (in units of cm./dyne), the equivalent mass $M_S$ of the stylus and its elastic support, referred to the stylus tip 1' (in units of grams) and the equivalent mass $M_{ta}$ of the tone arm 5, referred to the stylus tip 1' (grams) have certain predetermined specification restrictions, as derived and set forth in my article "The Rational Design of Phonograph Pickups," appearing in the Journal of the Audio Engineering Society, October 1962, vol. 10, No. 4, pp. 274–289. First, the product $M_BC_{LV}$ should be at least substantially $(14.7 \pm 1.6) \times 10^{-6}$; or, otherwise stated, the stylus suspension compliance should be such that the total bearing weight will produce a static deflection at the stylus of at least substantially $5.7 \pm 0.6$ mil (one mil$=10^{-3}$ inches). Secondly, the equivalent tone-arm mass $M_{ta}$ should not exceed about 13 times the bearing weight, nor about 6 times the bearing weight if the steady-state damping of the tone-arm is comparable with the damping at tone-arm resonance. Thirdly, assuming $1000g$ as a conservative maximum acceleration (cm./sec.$^2$) of the stylus tip 1' arising in tracing of the modulated record groove, the effective dynamic mass $M_S$ of the stylus should not exceed substantially 0.33 mg. for each gram of total bearing weight.

These design criteria, however, must be considered in the light of certain critical frequencies if the ends of the invention are to be attained. These are the frequencies of tone-arm resonance $f_{ta}$, stylus suspension free-resonance $f_{lcf}$, the first compliantly restrained mode of the stylus suspension $f_0$, a translation-loss cut-off frequency $f_g$, and a scanning loss cut-off frequency $f_s$, later defined.

The tone-arm resonance frequency $f_{ta}$ is given by the relationship $$f_{ta} = \frac{1}{2\pi}(C_{LV}M_{ta})^{-1/2}$$

but there are practical upper and lower limits $C_{LV}$ and $M_{ta}$, respectively, as before explained. For mechanical stability, reliable tracking and allowable deflections and strain in the stylus suspension, it has been found that $f_{ta}$ should not be reduced below about 10 c./s., but may be increased to as high as about 15 to 18 c./s. if an extremely light tone arm is achieved.

The stylus suspension free resonance $f_{lcf}$ is the fundamental vibration frequency of the stylus system when the stylus is not in contact with the record groove. In actual practice, however, this frequency does not appear in the output of a pickup in normal use since the stylus motion is actually positively controlled by the modulation of the record groove.

In its restrained operation in contact with the groove walls, however, a stylus-groove system designed in accordance with the teachings of my above-mentioned paper will produce a restrained mode of resonance at a frequency $f_o$ given substantially by $$\frac{f_o}{f_{lcf}}=(C_{LV}/C_r)^{1/2}=0.22E_v^{1/3}r^{1/6}X_S^{1/2}M_B^{-1/3}$$

where $C_r$ is the record compliance, $E_v$ is the constrained elastic modulus of the record material ($E_v=E/(1-\nu^2)$, where E is Young's modulus and $\nu$ is Poisson's ratio, $r$ is the radius of the stylus tip 1', and $X_s$ is the maximum vertical displacement amplitude of record-groove modulation. Thus, for example, as explained in my above-mentioned paper, for a record with $E_v=3.76\times10^{10}$ dynes/cm.$^2$, $r=0.7$ mil, and $X_S=1.9$ mil, the restrained stylus-groove system resonance frequency $f_o$ and the ratio $f_o/f_{lcf}$ may be expressed substantially as $$f_o=40.7/M_B^{1/3}\text{(kc./s.)}$$

$$f_o/f_{lcf}=18.0/M_B^{1/3}$$

In actual practice, a series of restrained stylus-groove resonances will occur at each of the higher-order modes of vibration of the distributed system comprising the stylus suspension and its contact with the groove wall. Whenever any one of these resonance frequencies falls within the frequency range of interest and is not adequately damped by dissipation in the stylus suspension or by the lossy material of the plastic record, it will appear in the output as a spurious response.

The foregoing can be summarized by stating that "stylus-groove resonances" will occur, that they constitute the clamped-supported modes of vibration of the stylus suspension as modified by the finite compliance of the "support" at the stylus-groove contact, that these resonances will occur at frequencies slightly lower than the corresponding natural frequencies for the same stylus system when it is rigidly clamped at the base and rigidly supported at the stylus tip, and that a moderate amount of damping of these compliantly restrained modes may be useful, necessary, or even unavoidable. It can also be concluded, however, that enough damping to suppress these modes completely is almost sure to be excessive, and that relief from their harmful effects should be sought by placing the resonances above the frequency range of interest.

Turning, now, to translation-loss, this is defined as the outside-to-inside drop in playback level resulting from the fact that, for any given amplitude of record groove modulation, the playback level is usually lower for the inside grooves than it is for the higher-velocity grooves near the outer edge of the record. This loss has its physical origin in the fact that the groove-wall stiffness is slightly altered by the wall curvature produced by groove modulation. In effect the groove wall becomes slightly stiffer on the concave side and less stiff on the convex side. As a result the indentation of the groove wall produced by the total bearing force is reduced on the concave side and increased on the convex side. This differential shift of indentation from one groove wall to the other produces a slight displacement of the stylus with respect to the centerline of the modulated groove, always in the direction corresponding to a reduction of the stylus excursion. A characteristic translation-loss cut-off frequency $f_g$ may be defined as $$f_g=0.0485V(E_v/rM_B)^{1/3}\text{ (c./s.)}$$

where V is the groove velocity in cm./sec. For the previous typical values of $E_v$ and $r$, this reduces to:

$$f_g=1.34V/M_B^{1/3}\text{ (kc./s.)}$$

The inside and outside grooves of a 12-inch 33⅓ r.p.m. record will have velocities of about 21 and 50.5 cm./sec., so that inside and outside translation-loss cut-off frequencies $f_{gi}$ and $f_{go}$ may be expressed as:

$$f_{gi}=28.1/M_B^{1/3}\text{ (kc./s.)}$$

and $$f_{go}=67.7/M_B^{1/3}\text{ (kc./s.)}$$

All these relations, as well as the qualitative argument given above, indicate that translation loss will operate most drastically on signals lying in the upper portion of the frequency range of interest. For design guidance, therefore, these relations should be evaluated for a frequency $f_u$ representing the upper cut-off of the recorded signal spectrum. On this basis, for the translation loss not to exceed 6 db for all frequencies $f\leqq f_u$, it is required that $f_{gi}\geqq1.35f_u$. Similarly, for a translation loss limit of 2 db, $f_{gi}\geqq2.05\,f_u$.

The translation loss, moreover, to the first order of approximation presented here, is entirely independent of the structural details of the pickup and the dynamics of the stylus suspension. This leads to the conclusion that the bearing weight must not exceed about 1.3 gram if the design specification calls for a translation loss of 3 db or less at an upper cut-off frequency of 15 kc./s.

Another component of playback loss can be identified as the scanning loss which arises as a result of the finite area of the circle of contact between the stylus and the record groove wall. It is obvious that the response will be drastically reduced if the recorded wavelength is smaller than the diameter of the circle of contact, and the analysis presented in my before-mentioned article indicates that the scanning loss factor S varies with frequency after the manner of a low-pass filter.

The groove-wall curvature and the finite size of the circle of stylus contact thus cooperate to give rise to two loss factors: one is a translation-loss factor G which operates on the fundamental-frequency output, and the other is the scanning-loss factor S which operates on all output components. These loss factors are nearly equal in magnitude when each is very small ($\leqq1$ db), but G decreases more rapidly with increasing frequency and carries the fundamental-frequency output to extinction at $f=f_g$. At this same critical frequency, S has a value corresponding to a scanning loss of about 8 db and an attenuation slope which is about $-12$ db/octave at $f=f_g$ and which increases rapidly thereafter. As a result of this behavior, the abatement by scanning loss of all distortion products, including the pinch effect, can be characterized as the action of a low-pass filter having a nominal cut-off frequency approximately equal to $f_g$, the extinction frequency of the translation-loss function.

It is now in order to set forth the criteria required for the practice of the invention in order to attain the novel results previously described. In most cases, the pickup designer has no direct control over the elastic modulus of the record material or the magnitude and range of variation of the groove velocity. The requirements of standardization and the hazards of tracing distortion also restrict severely his latitude of choice in selecting the stylus tip radius. Moreover, the stylus compliance can be presumed to be fixed within relatively narrow limits. It would appear, therefore, that the only mechanical variables remaining at the disposal of the designer are the bearing weight and the mass and structural form of the stylus suspension.

Almost complete suppression of translation-loss can be reasonably interpreted as a requirement that such loss $N_g\leqq2$ db for all frequencies below $f_u$. Then it follows that $f_{gi}=2.05\,f_u$, and $f_u=13.74/M_B^{1/3}$(k.c./s.), where the numerical constant subsumes the same typical record material, groove velocity, and stylus radius above used. Otherwise stated, the mass $M_B$ in grams should be less than substantially $2600/f_u^3$, where $f_u$ is expressed in k.c./s. The variation of $f_u$ with the inverse cube root of $M_B$ indicates that bandwidth free from translation loss comes at a high price in terms of bearing weight. Thus, for example, $M_B$ must be reduced from 5 grams to 0.77 gram in order to extend the bandwidth without translation loss from 8 k.c./s. to 15 k.c./s. As noted above, the implied thrust toward lighter bearing weights is clear and persuasive.

An upper limit on the stylus mass has before been mentioned and it has already been suggested that the restrained stylus-groove resonance frequency $f_o$ should be placed above the frequency range of interest. How much smaller the stylus mass should be and how far this resonance should be placed above $f_u$ are questions which will now be considered.

Two considerations influence the placement of $f_o$: one is concerned with avoiding trouble and the other with achieving superior performance. Channel separation and frequency response are each degraded if $f_o$ lies within the frequency range of interest, and a tracking hazard arises if it lies within the octave extending from $f_u$ to $2f_u$. This is the octave containing the upper half of the spectrum of second-order distortion products which dominate in controlling the stylus acceleration demand. When $f_o$ falls within this range, the enhanced stylus motion at resonance increases the acceleration demand and reduces in proportion the upper limit imposed on the stylus mass. This consideration alone would be sufficient to dictate that $f_o$ be at least as high as $2f_u$.

The first compliantly restrained mode of the stylus system, moreover, can be excited at its resonance frequency either by surface noise or by the higher-order products of tracing distortion. Such excitation will be intermittent and asynchronous, and hence the stylus motion at its resonance frequency will be relatively steady and will vary in amplitude with the effective Q which characterizes the height and width of the resonance. Since this stylus motion at resonance is not synchronously locked with any component of the recorded signals, it qualifies as an externally introduced and essentially unmodulated carrier.

If the compliance of the stylus-groove contact were strictly linear, the presence of this vibrational carrier signal would be of no concern since neither the carrier nor its neighboring noise components could reach the band-limited output circuit. The stylus-groove contact is nonlinear, however, and so the noise and distortion components lying within $f_u$ of the excited resonance frequency can intermodulate with the vibrational carrier to produce a contribution to the in-band noise below $f_u$.

It can be concluded, therefore, that the stylus groove resonance will almost always be excited sufficiently to produce by intermodulation a substantial contribution to the in-band noise—unless something else is done about it in accordance with the present invention. A particular arrangement of the upper critical frequencies provides a novel opportunity to achieve uniquely superior performance. The key to this situation resides in the beneficial use of the scanning loss to prevent the excitation of stylus resonance. Consider the following premises: The inside cut-off frequency for translation loss $f_{gi}$ should be placed at or above $2f_u$ in order to suppress translation loss throughout the range below $f_u$. The corresponding outside cut-off frequency $f_{go}$ will be higher than $f_{gi}$ by the ratio of the groove velocities, so that $f_{go}$ will occur at approximately $5f_u$. It has also been pointed out that the cut-off, or extinction, frequencies for translation loss can be taken as the effective cut-off frequencies for the low-pass filtering action of the scanning loss. It follows then that the specification $$f_o \geqq f_{go}$$

will be sufficient to insure that the excitation of the stylus-groove resonance by either surface noise or signal distortion products will be effectively interdicted by the scanning loss and that the associated contribution of in-band noise will be eliminated, thereby providing a "low-noise" design specification.

In a practical example, it has been determined that this "low-noise" design specification requires that the dynamic stylus mass $M_s$ should be less than 0.14 mg. for each gram of total bearing weight, a requirement that is more than twice as severe as the one established previously on the basis of acceleration demand.

Present-day stereo pickup systems and prior-art pickups fail to achieve these design criteria and parameters and not only do not attain the ultra light-weight properties of the invention, but fail to approximate the low-noise specifications which are attainable by the practice of this invention.

As an illustration, a few present-day pickups are available in which the bearing weight is of the order of one to two grams and in which the stylus mass has been reduced to one or two milligrams. Such units fail by ratios of from four to seven to meet the above-described low-noise design criteria of the present invention. The stylus for a one-gram bearing weight should have a mass $M_s$ of not more than 0.14 milligram, and the stylus for the two-gram bearing weight should have a mass $M_s$ of not more than 0.28 milligram, if the novel results of the invention are to be attained.

Modifications will occur to those skilled in the art and all such are considered to fall within the spirit and scope of the invention as defined in the appended claims.

What is claimed is:

1. A low-noise ultra-lightweight pickup comprising an arm-supported stylus for engaging the grooves of phonograph records of elastic modulus $E_v$, groove velocity V and an uppermost recorded frequency $f_u$, the stylus having an equivalent mass of value only sufficient to resonate with the elasticity of the walls of the record grooves at a frequency $f_o$ above both $f_u$ and the cut-off translation-loss frequency $f_g$ determined substantially by the relationship $$f_g = 0.0485V(E_v/rM_B)^{1/3}$$

where $r$ is the radius of the said stylus and $M_B$ is the pickup bearing weight.

2. A pickup as claimed in claim 1 and in which the said weight $M_B$ is adjusted to set the frequency $f_g$ to a value $\geqq 2f_u$.

3. A pickup as claimed in claim 2 and in which the value of V is the inside-groove velocity.

4. A pickup as claimed in claim 1 and in which the said weight $M_B$ is adjusted to set the frequency $f_g$ to a value $\geqq 5f_u$.

5. A pickup as claimed in claim 4 and in which the value of V is the outside-groove velocity.

6. A pickup as claimed in claim 1 and in which $f_o$ is equal to or greater than substantially $40.7/M_B^{1/3}$ (k.c./s.).

7. A pickup as claimed in claim 1 and in which $M_B$ in grams is less than substantially $2600/f_u^3$, where $f_u$ is in k.c./s.

8. A method of suppressing the introduction of noise into the frequency band of interest of upper frequency $f_u$ in a phonograph record as a result of intermodulation between surface noise and the excited resonance frequency $f_o$ of the reproducing stylus engaging the record grooves, that comprises adjusting the pickup bearing weight to set the cut-off translation loss frequency $f_g$ to a value greater than $f_u$, and adjusting the equivalent stylus mass to tune the said resonance frequency $f_o$ to a value above the translation loss cut-off frequency $f_g$.

9. A method as claimed in claim 8 and in which the frequency $f_g$ is adjusted to a value $\geqq 2f_u$.

10. A method as claimed in claim 8 and in which the frequency $f_g$ is adjusted to a value $\geqq 5f_u$.

11. A method as claimed in claim 8 and in which the said cut-off translation loss frequency $f_g$ is for the inner-groove record velocity and is adjusted to a value $\geqq 2f_u$.

12. A method as claimed in claim 8 and in which the said cut-off translation loss frequency $f_g$ is for the outer-groove record velocity and is adjusted to a value $\geqq 5f_u$.

13. A method of reducing the noise in the reproduction of a phonograph recording which comprises moving the stylus along the record grooves to reproduce a band of frequencies up to a value $f_u$, and suppressing the components of noise occurring at frequencies below the frequency $f_u$ which are produced by intermodulation between the components of surface noise occurring at frequencies above $f_u$ and the excitation of the stylus at its resonance frequency during engagement with the record grooves.

References Cited by the Examiner

UNITED STATES PATENTS

| | | | |
|---|---|---|---|
| 3,051,494 | 8/1962 | Walton | 274—23 |
| 3,167,317 | 1/1965 | Wilson | 274—23 |

NORTON ANSHER, *Primary Examiner.*

C. B. PRICE, *Assistant Examiner.*